Nov. 26, 1935. W. I. TEBO 2,021,904
AUXILIARY MEANS FOR GOVERNING THE FASHIONING
MECHANISM OF FLAT KNITTING MACHINES
Filed Nov. 23, 1929 7 Sheets-Sheet 1
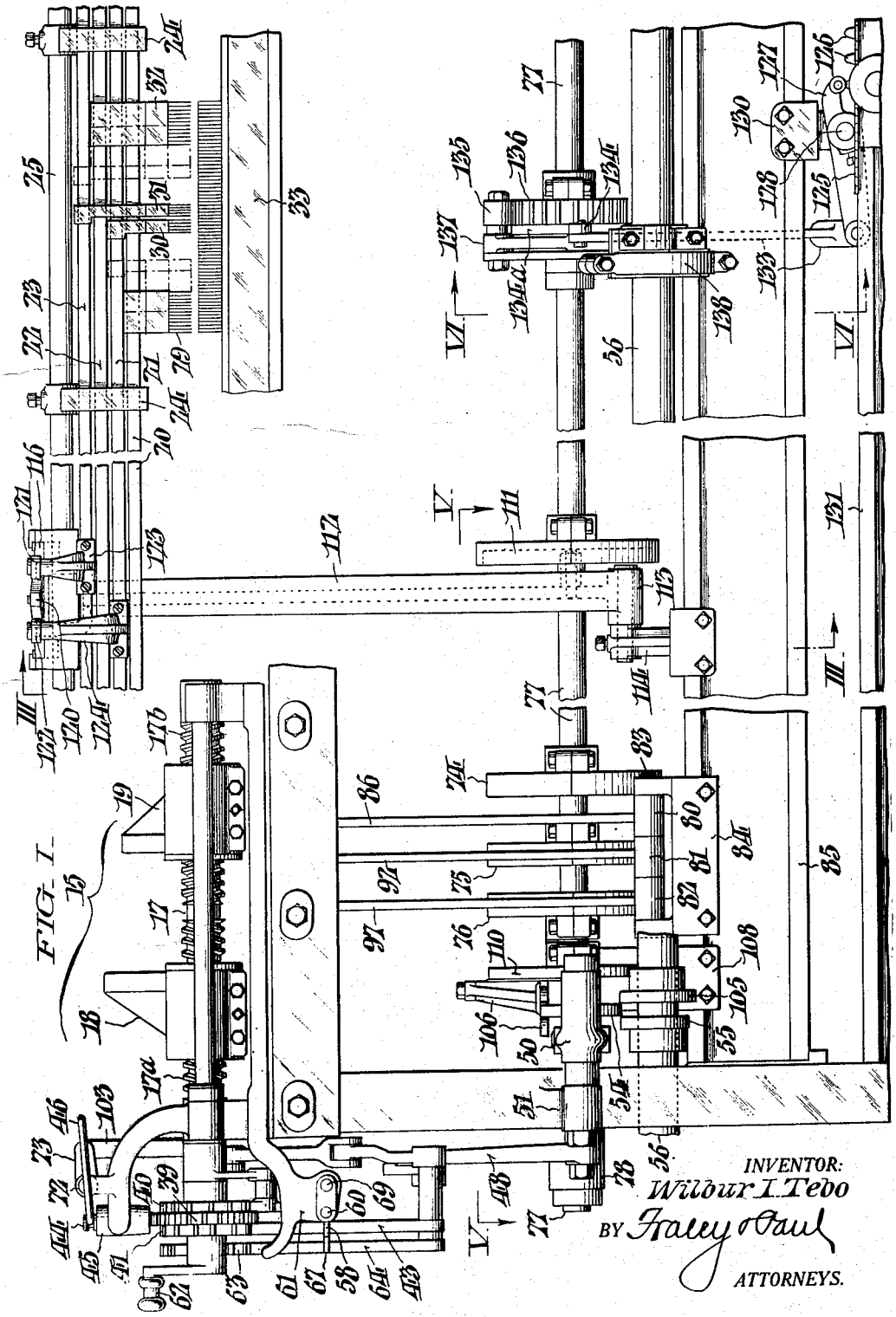
INVENTOR:
Wilbur I. Tebo
BY Fraley & Paul
ATTORNEYS.

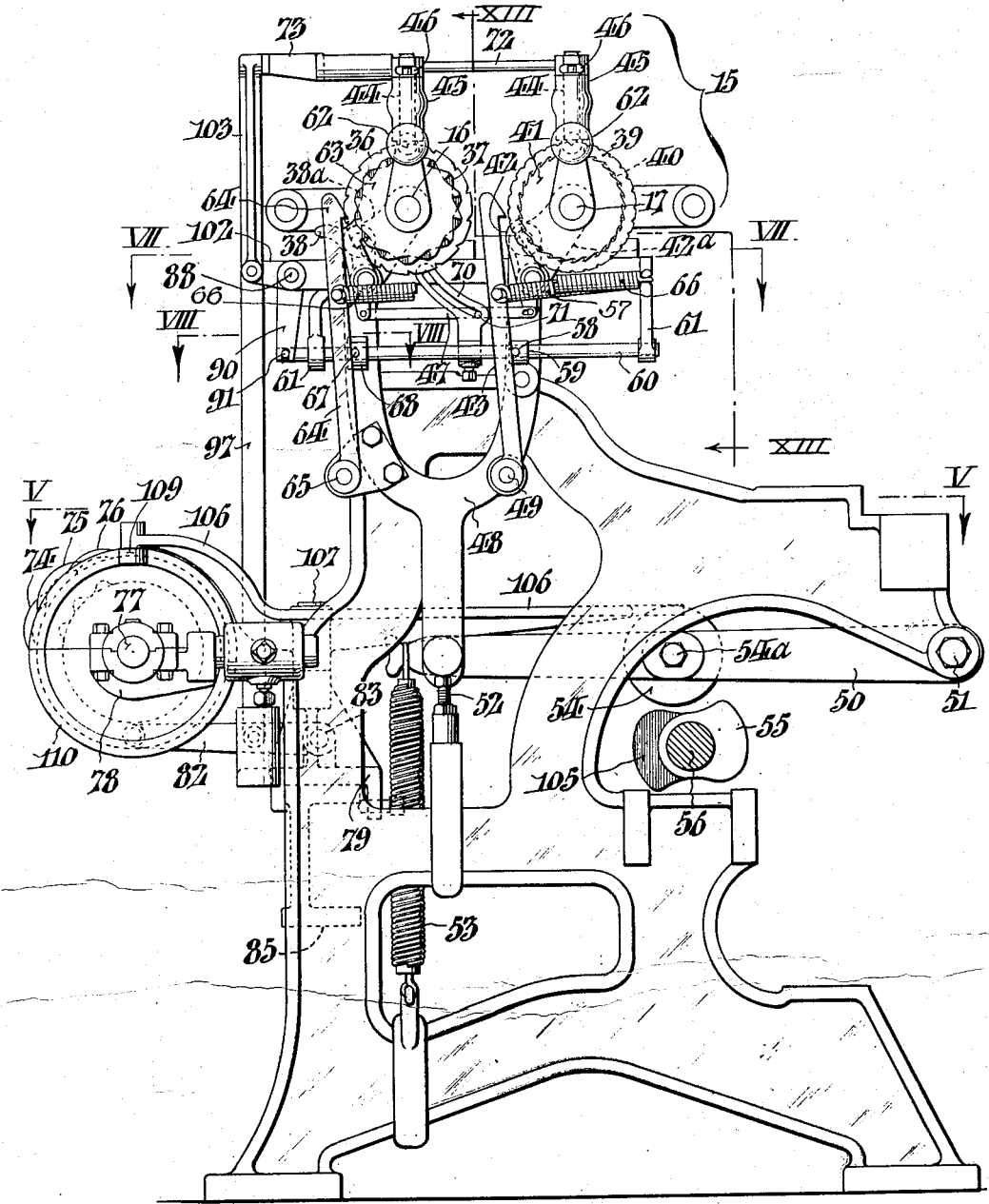

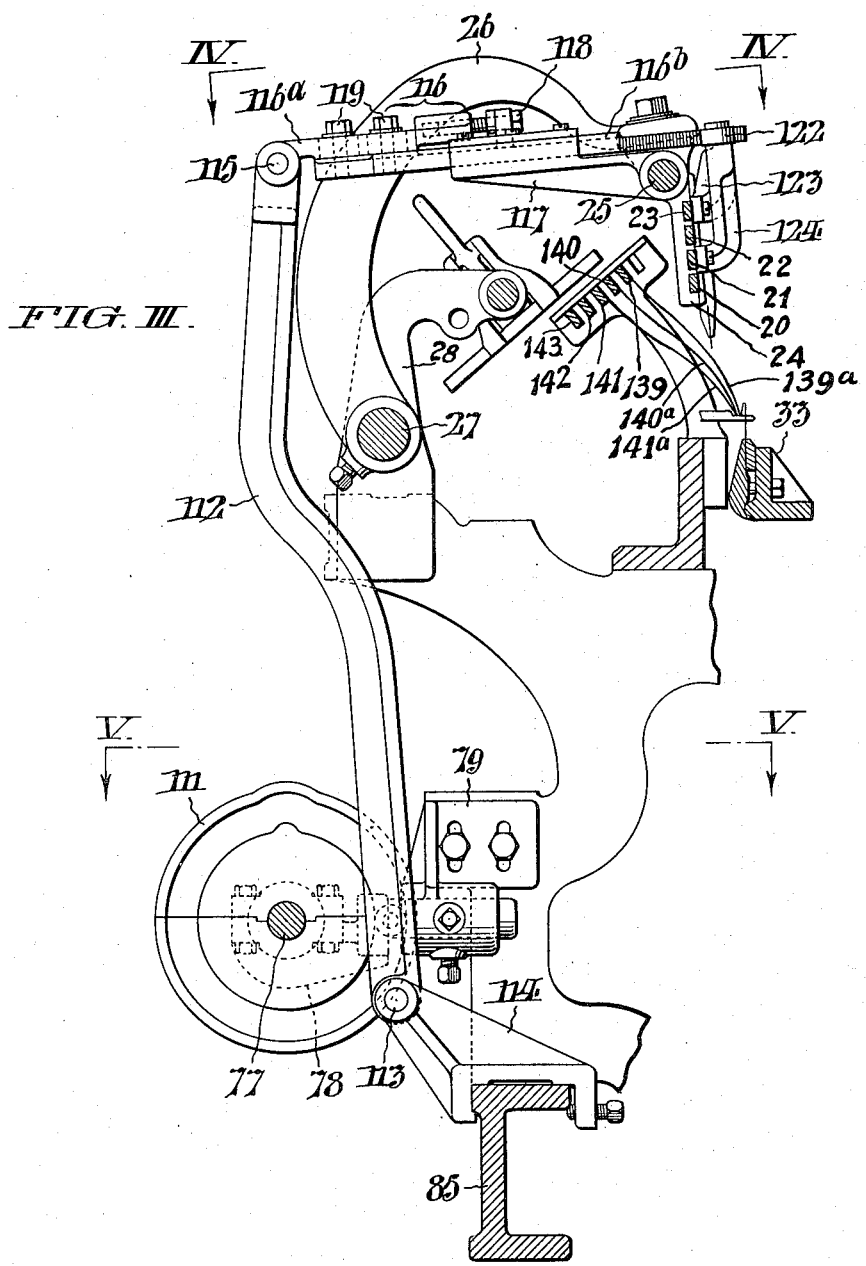

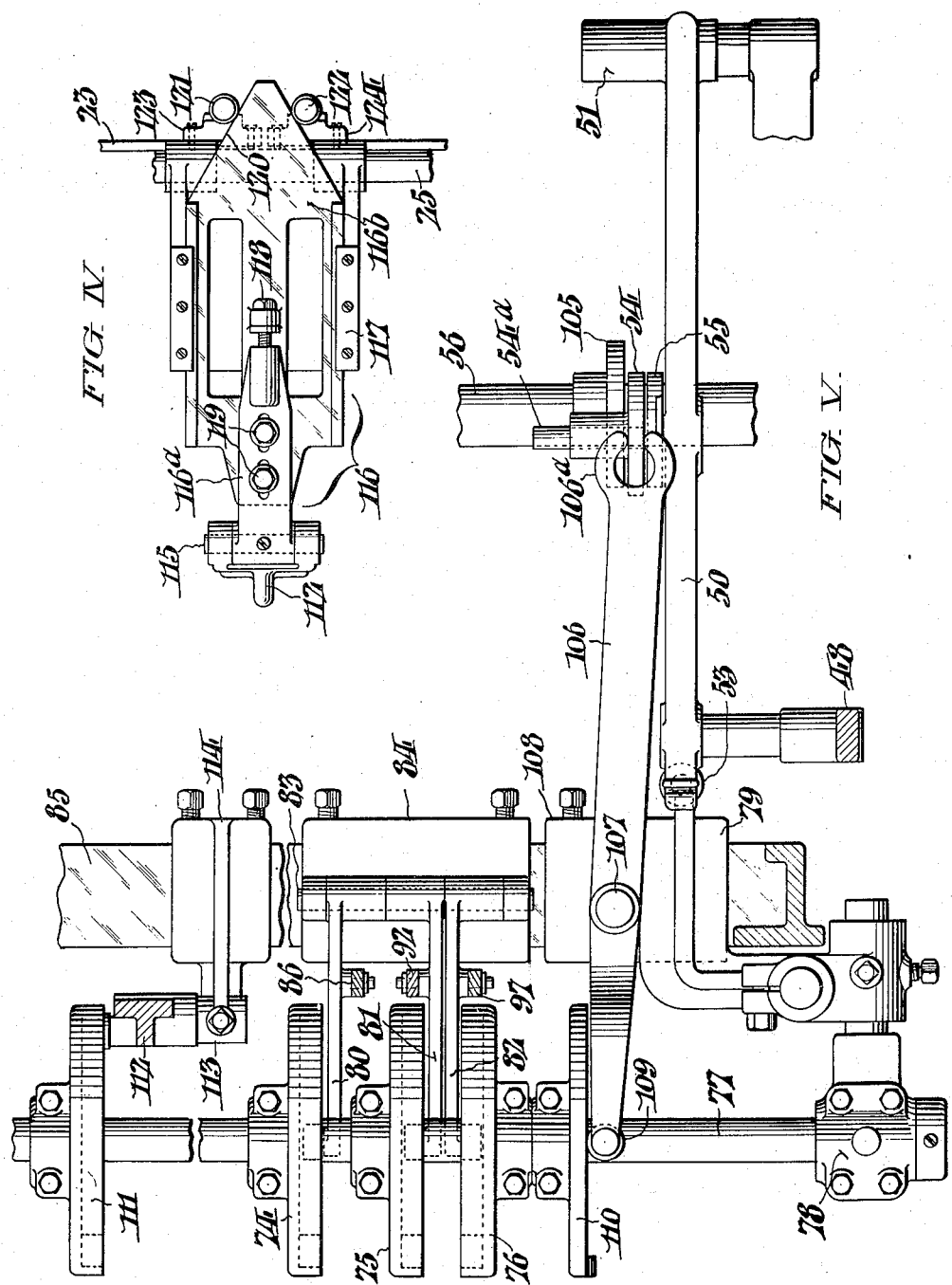

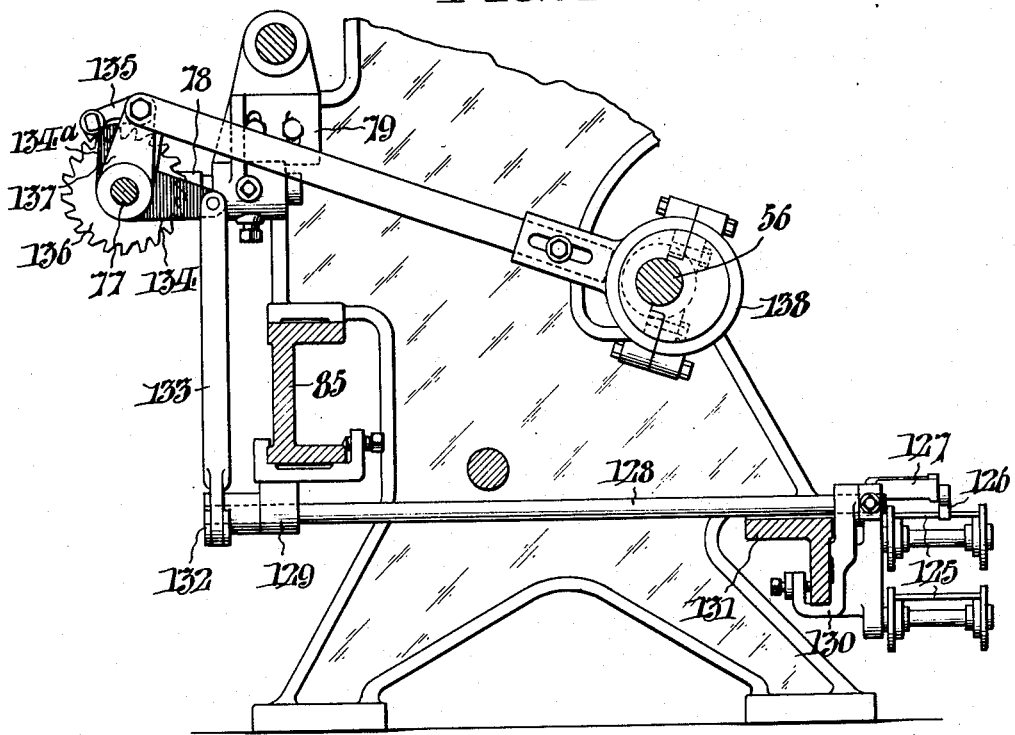
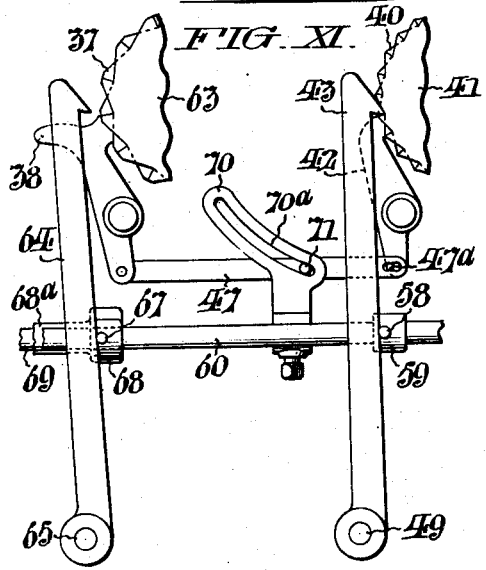
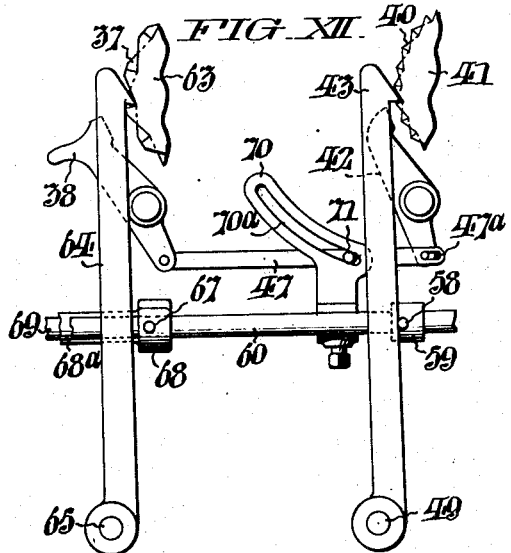

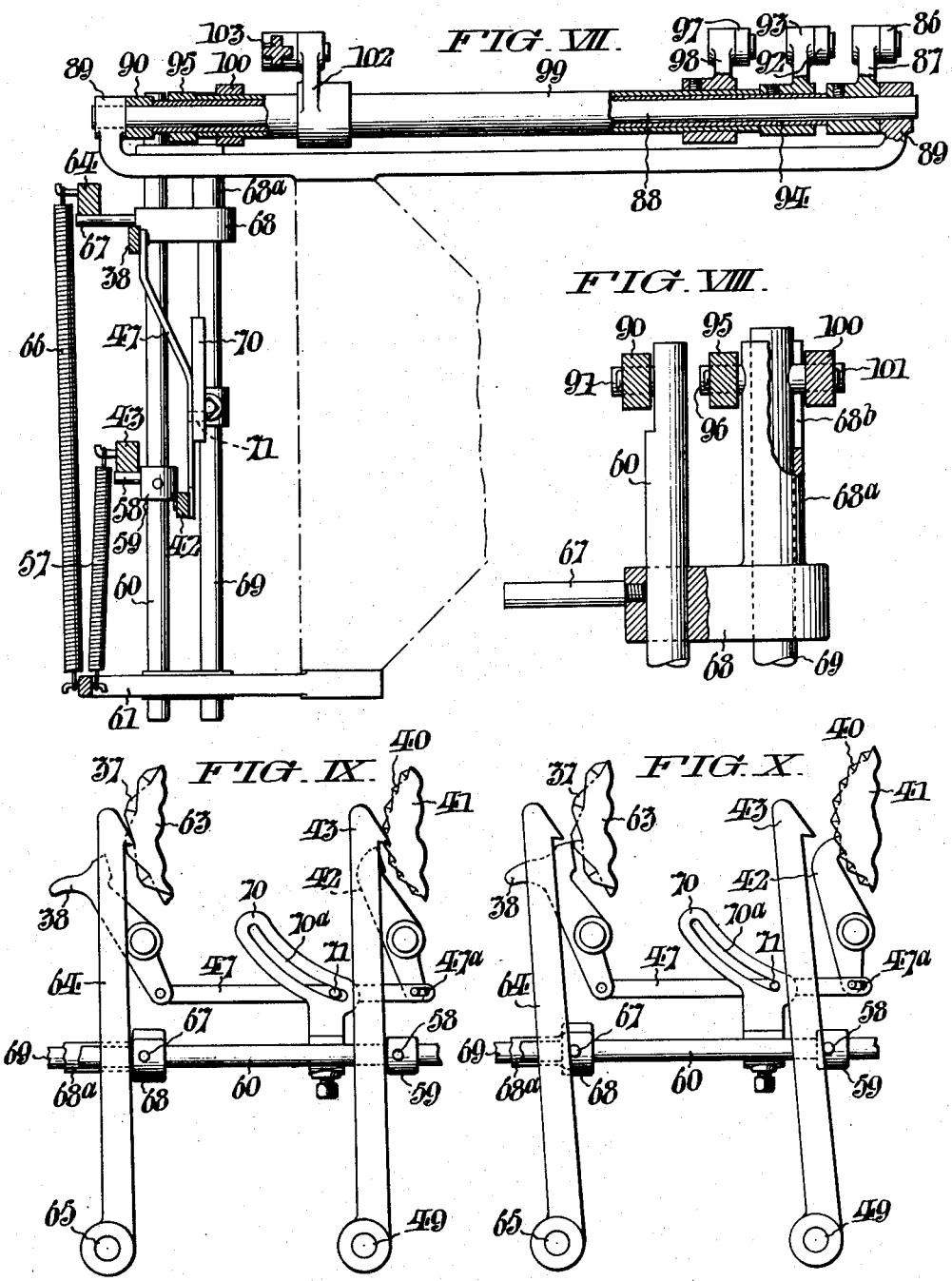

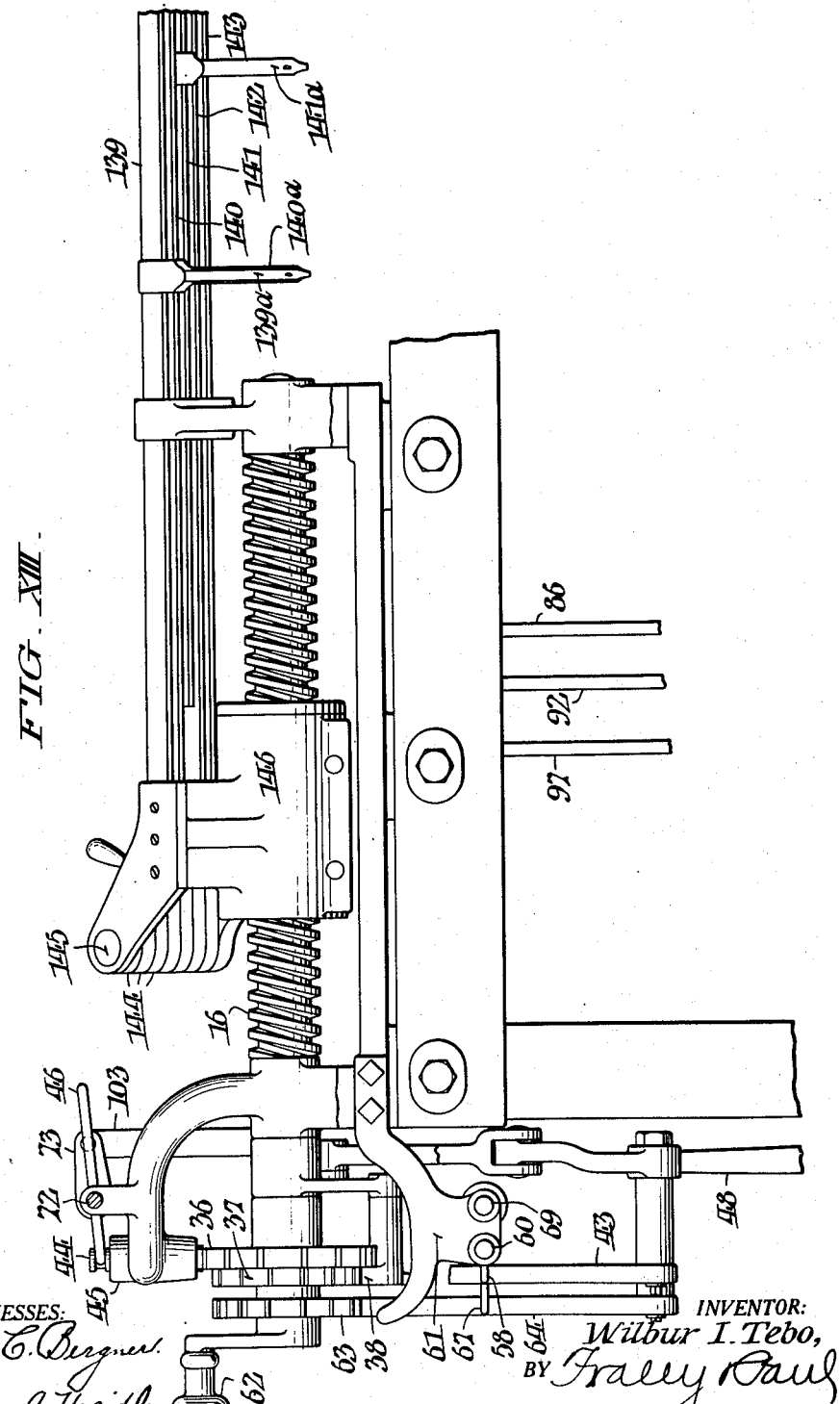

Patented Nov. 26, 1935

2,021,904

UNITED STATES PATENT OFFICE 2,021,904

AUXILIARY MEANS FOR GOVERNING THE FASHIONING MECHANISM OF FLAT KNITTING MACHINES

Wilbur I. Tebo, Philadelphia, Pa., assignor to Haines Hosiery Mills Inc., Philadelphia, Pa., a corporation of Pennsylvania Application November 23, 1929, Serial No. 409,197

19 Claims. (Cl. 66—89)

This invention relates to means for governing the fashioning mechanism of flat knitting machines. More particularly, my invention has reference to straight or bar knitting machines employed in the manufacture of full fashioned hosiery, including both "leggers" and "footers".

In machines of the specific types referred to, the fashioning or shaping to the desired configuration of the knitted webs produced by them, is accomplished through sidewise transfer of fabric loops between adjacent needles by means of "narrowing" fingers. These narrowing fingers are attached to slide bars arranged to be progressively shifted toward each other longitudinally of the needle bars through the medium of a feed screw which is intermittently rotated by racking instrumentalities embodied in the fashioning mechanism, under control of the measuring chain of the machine. The throw of the carriers delivering yarns to the needles is in a similar manner concurrently reduced as required incident to fashioning of the webs, i. e., by a separate feed screw of the fashioning mechanism. In the operation of "footers" heretofore it has been necessary, during the interval between the shaping of the stocking instep and the commencement of the toe, for the attendants to set the narrowing fingers in readiness for shaping the toe. It has also been necessary heretofore, at the completion of each knitting cycle, both of the "leggers" and "footers", to reset the fashioning mechanism manually, or in other words, the feed screws had to be reversely rotated or "back-racked" by hand to restore the yarn carriers and the narrowing fingers to their original positions preparatory to starting of a new set of stocking legs or feet. These operations were involved, particularly in the case of the "footers", and necessitated great skill as well as strict attentiveness on the part of the operatives; and moreover entailed stoppage of the machines over comparatively long periods between knitting cycles.

The main object of my invention is to overcome the several indicated drawbacks of previous practice through provision of a simple, reliable and inexpensive means capable of automatically effecting all the operations heretofore performed by hand, both with regard to setting the fashioning mechanism incident to knitting and resetting it, as well as the yarn carrier control mechanism, after completion of the knitting cycle of the machines, thereby obviating the possibility of errors on the part of the attendants, avoiding loss of valuable time during and between the knitting cycles, and effecting a great saving in manufacturing costs through elimination of special or skilled help.

Still other objects and advantages of this invention will be manifest from the detailed description following of the typical embodiment illustrated in the drawings, wherein Fig. I is a fragmentary side elevation of a typical full fashioned stocking foot knitting machine conveniently embodying my auxiliary control means.

Fig. II is an elevation of the left hand end of the machine as considered in Fig. I.

Fig. III is a fragmentary cross sectional view of the machine, on a larger scale, taken as indicated by the arrows III—III in Fig. I.

Fig. IV is a fragmentary detail illustration, viewed as indicated by the arrows IV—IV in Fig. III.

Fig. V is a fragmentary plan section of the machine, taken as indicated by the arrows V—V in Figs. I, II and III.

Fig. VI is a fragmentary cross section of the machine, taken as indicated by the arrows VI—VI in Fig. I.

Fig. VII is a detail plan section, taken as indicated by the arrows VII—VII in Fig. II.

Fig. VIII is a detail sectional view, taken as indicated by the arrows VIII—VIII in Fig. II.

Figs. IX, X, XI and XII are diagrammatic views showing how the racking elements for the narrowing mechanism of the machine are variously controlled in accordance with my invention; and Fig. XIII is an illustration corresponding to Fig. I with parts broken away to expose the yarn carrier rods and the stop means therefor, said illustration being viewed as indicated by the arrows XIII—XIII in Fig. II.

With more detailed reference to these illustrations, a narrowing head (there being one such at each end of the machine ordinarily) of the fashioning mechanism is generally designated by the numeral 15 in Figs. I and II, the same embodying a feed screw 16 for the yarn carrier stop nuts (hereinafter described), and a feed screw 17 for the stop nuts 18, 19 that limit the movement of the narrowing point rods, indicated at 20, 21, 22 and 23 in Figs. I and III, in the well known way. The bars 20—23 are slidable longitudinally of the machine in bearing members 24 which are attached to a shaft 25 sustained by upward reaching supporting arms 26. These arms 26 are in turn secured to a rock shaft 27 with journal support in bearings 28 afforded by the machine frame. Through movement imparted to the arms 26 by means not illustrated, narrowing fingers 29, 30, 31 and 32 respectively on the rods 20, 21, 22 and 23 are dipped to engage the knitting needles, whereof one of the banks is shown at 33 in Figs. I and III, for the purposes of loop transfer. The feed screw 17 has the usual right and left hand threads 17a, 17b (Fig. I) at opposite ends for operation respectively upon the stop nuts 18, 19. After customary practice, the two feed screws 16 and 17 are disposed in parallel relation and supported for rotation in suitable bearings at the top of the machine frame. At its outer end, the screw 16 is fitted with an index disk 36, as well as with a ratchet wheel 37 having teeth which correspond in number to the peripheral notches in said disk, the ratchet 37 being adapted to effect forward rotation of the screw 16 when picked by a pawl 38. The feed screw 17 is likewise fitted with an index disk 39 which is interposed between a pair of oppositely pitched ratchet wheels 40, 41. The ratchet 40 is arranged to be picked clockwise or forward by a pawl 42 and the ratchet 41 counter-clockwise or backward by a spring-pulled back-racking hook-pawl 43. To prevent excess rotation of the feed screws 16, 17, spring pressed plunger detents 44 (Figs. I and II) are provided to cooperate with the notches in the index disks 36, 39, these detents having guidance for vertical sliding movement in bearings 45 and they are liftable manually from engagement with said disks by hand levers 46. As best shown in Fig. II, the pawls 38, 42 are individually connected to arms 38a, 42a, swingable freely on the ends of the feed screws 16, 17, and moreover coupled by a connecting link 47 so that said pawls may be simultaneously withdrawn from action manually when required, a finger projection being provided on the pawl 38 to facilitate this operation. The arms 38a, 42a carrying the pawls 38, 42 are oscillated by virtue of connection to a vertically reciprocating yoke member 48 to which the back-racking hook-pawl 43 is directly pivoted at 49. Up and down motion is imparted to the yoke member 48 through the medium of an arm 50 which is fulcrumed at 51 to the machine frame and normally maintained in contact with an adjustable stop 52 under the pull of a spring 53, see Fig. II. Intermediate its ends, the arm 50 carries a roller 54 which is adapted to be influenced by a single lobed cam 55 (Figs. I, II, and V) on the main cam shaft 56 of the machine. The back-racking hook-pawl 43 is normally held away from the ratchet wheel 41 against the action of a tension spring 57, Figs. II and VII, by a stud projection 58 on a collar 59 secured to a rod 60, the latter being slidable crosswise of the machine frame in bearings 61.

The parts thus far described are common to full fashioned stocking footing machines. They are brought into action through shifting of the main cam shaft 56 to the right as considered in Fig. I, or upwardly in V, whereby the single lobed cam 55 on said shaft is moved into the plane of the roller 54 on the arm 50. Accordingly, the arm 50 is rocked up and down once for each course of fabric knit by the machine with impartation of movement, through the yoked member 48 to the several pawls 38, 42 and 43 which actuate the ratchet wheels 37, 40 and 41 on the feed screws 16, 17, thereby to vary the shifting of the narrowing point rods 20—23 and the yarn carrier rods (hereinafter described) as required to properly fashion the stocking feet. Although entirely automatic in operation incident to the fashioning phases of the knitting, it has been necessary heretofore to position the narrowing fingers 29—32 in readiness for shaping the stocking toes, and at the completion of each knitting cycle to reset the yarn carrier rods, as well as the narrowing fingers, for restarting on a new set of stocking feet through manual rotation of the feed screws 16, 17 individually by means of hand cranks 62 (Figs. I and II) provided on them for that purpose, the detents 44 being of course held raised from the index disks 36, 39 at these times by depression on the hand levers 46.

To obviate the necessity for the described manual operations I make provisions as follows: On the yarn carrier feed screw 16, I secure an additional ratchet wheel 63 with teeth pitched oppositely to those of the ratchet wheel 37 and adapted to be picked by a supplemental back-racking hook-pawl 64 which is pivotally attached at 65 to the left hand extremity (Fig. II) of the yoke member 48. This supplemental hook-pawl 64 is subject to a pull spring 66, and is normally held retracted from the ratchet wheel by a lateral pin 67 on the collar 68 which is independently shiftable on another rod 69 slidable in the brackets 61 behind the slide rod 60, see Figs. VII and VIII. It is to be particularly noted from Fig. VIII that the collar 68 is apertured for free guidance on the rod 60. As shown in Figs. II and IX–XII, the slide rod 69 carries a cam piece 70 with an arcuate slot 70a adapted to be engaged by a lateral stud 71 on the link 47 connecting the pawls 38, 42. For a purpose explained later on, the link 47 is formed with a slot 47a at the region of its connection with the pawl 42. To permit of simultaneous actuation, the release hand levers 46 for the index wheel detents 44 are secured to a common axis 72 and actuated by separate rotary cams 74, 75 and 76 (Figs. I and V) on an auxiliary cam shaft 77 which extends along the back of the machine where it is sustained in bearings 78. These bearings 78 are secured, with capacity for vertical and horizontal adjustment, to supplemental brackets 79 attached to the machine frame. The rotary cams 74, 75 and 76 are influential upon roller arms 80, 81 and 82 (Fig. V) which are fulcrumed for independent movement on a shaft 83 supported by a bracket 84 fast on a longitudinal rail 85 of the machine frame. As shown in Figs. IV and VII, the roller arm 80 is coupled, by means of an upward connecting link 86, with a lever 87 secured to one end of a shaft 88 having journal support in bearings 89 at the top of the machine frame, see Figs. II and VII also. A forked lever 90 (Figs. II, VII and VIII) on the opposite end of the shaft 88 engages a pin 91 on the slide rod 60 controlling the back-racking pawl 43. The roller arm 81 associated with the rotary cam 75 on the auxiliary cam shaft 77 is likewise coordinated, by means of a vertical link 92, with an arm 93 at one end of a sleeve 94 which is independently rockable on the shaft 88 and at its other end fitted with a clevised arm 95 in engagement with a pin 96 on a tubular extension 68a of the collar 68 for controlling the back racking pawl 64. The roller arm 82 associated with rotary cam 76 is in turn coordinated, by means of a vertical link 97, with an arm 98 on another sleeve 99 independently rotatable about the sleeve 94 on the shaft 88, and fitted on its opposite end with a forked lever 100 to engage a pin 101 on the slide rod 69 controlling the pawls 38, 42. As shown in Fig. VIII, the pin 101 passes through a slot 68b in the tubular extension 68a of collar 68. The outer sleeve 99 also has attached to it a third arm 102, which, through a link 103, is coupled with an arm 73 on the axis 72 carrying the release handles 46 for the index disk detents 44.

To effect rapid back-racking of the feed screws 16, 17 of the narrowing head 15, I mount on the main cam shaft 56 to one side of the single lobed cam 55, an auxiliary double lobed cam 105 (Figs. I and V) for action upon the roller 54 on the rocker arm 50, said roller being shiftable on its supporting stud 54a by means of a lever 106 which is swingable horizontally on a fulcrum stud 107 supported by a supplemental bracket 108 on the machine frame rail 85 alongside the bracket 84. As shown, one extremity of the lever 106 is clevised as at 106a, while its opposite end is fitted with a roller 109 that runs in contact with the side face of another rotary cam 110 on the auxiliary cam shaft 77.

On the auxiliary cam shaft 77 is mounted still another rotary cam 111 which is influential in rocking a vertical arm 112 with fulcrum attachment at 113 on a supplemental bracket 114 also attached to the machine frame rail 85, see Figs. III and V. The upper end of the arm 112 is pivotally connected at 115 to a slide 116 which is engaged in a guide 117, the latter being in turn engaged with the shaft 25 wherefrom the several transfer finger rods 20—23 are suspended. As shown in Figs. III and IV, the slide 116 comprises two parts 116a, 116b which are adjustable relatively by means of a screw 118, and fixable in adjusted positions by clamp bolts 119. The part 116b of the slide 116 has its front end tapered as at 120 for capacity to function as a wedge between rollers 121, 122 respectively supported by brackets 123, 124 reaching up from the narrowing point rods 21, 23.

The auxiliary cam shaft 77 may be intermittently rotated in any suitable manner, but for convenience I prefer to govern its actuation from the measuring chain of the machine which is indicated at 125 in Figs. I and VI. To this end I equip the chain 125, at suitable intervals, with buttons 126 which are adapted to under-travel and actuate a finger 127 attached to one end of a rock shaft 128 that extends crosswise of the machine frame at the bottom in supplemental bearings 129, 130 respectively attached to the frame rail 85 at the back of the machine, and a corresponding rail 131 at the front. At its opposite end, the shaft 128 has secured to it an arm 132 having a link connection 133 with a pawl guard 134 which is oscillatable independently on the auxiliary cam shaft 77. The pawl guard 134 has the form of a bell crank with an upward sector extremity 134a that controls the activity of a pawl 135 relative to a ratchet wheel 136 fixed on the auxiliary cam shaft 77, said pawl being attached to an arm 137 likewise mounted for independent oscillation on said auxiliary cam shaft alongside the pawl guard 134. From Fig. VI it will be observed that the arm 137 is continuously rocked back and forth by an eccentric 138 on the main cam shaft 56 of the machine.

Referring now more particularly to Figs. III and XIII, the yarn carrier rods of the machine are indicated at 139, 140, 141, 142 and 143, whereof there are in the present instance but five. Insofar as this invention is concerned, only the rods 139, 140 and 141 need be considered, these being respectively provided with yarn-laying fingers 139a, 140a and 141a. The finger 139a is here employed for laying a main yarn which is served to the needles of the knitting machine throughout the knitting of the stocking foot; while the fingers 140a and 140b are concurrently used to serve the splicing yarns for reinforcing the sole areas of the foot. The movement of the carrier rods 139, 140 and 141 is limited through abutment of their ends against individually-retractable stops 144, which, as is usual in full fashioned knitting machines, are pivoted on a common axis 145 supported by the stop nut 146 on the narrowing screw 16 hereinbefore referred to.

The performance of the described stocking foot knitting machine fitted with my improved auxiliary governing means is as follows: Assuming that a stocking leg has been transferred to the needle bank 33 in the usual way and that the machine is in operation and knitting the initial portion of the stocking foot with the ratchet pawls 38, 42, 43 and 64 quiescent and positioned as in Fig. II, each time the main cam shaft 58 is shifted to the right, the single lobed cam 55, in acting upon the roller 54 on the arm 50, causes a reciprocation of the yoke member 49 to the end that the ratchet wheels 37, 40 on the feed screws 16, 17 are each picked by the coordinated pawls 38, 42. The narrowing point fingers 29, 32 are thereby shifted toward each other a predetermined distance, and the throw of the yarn carriers 139a, 140a and 141a, at the time in action, limited correspondingly through concurrent rotation of the feed screws 16, 17. Several repetitions of this function at comparatively close intervals during the knitting, results in the shaping of the instep of the stocking foot immediately adjacent the heel cheeks of the transferred leg blank in accordance with usual practice in this art. The machine then proceeds to knit the medial or instep portion of the stocking foot as a parallel sided web, also as usual. During the ensuing interval, certain of the special buttons 126 on the measuring chain 125 function, through the intervening elements previously described, to induce movement of the pawl guard 134 (Fig. VI) so that the pawl 135 is permitted to pick the ratchet wheel 136 on the auxiliary cam shaft 77. Incident to this action, the rotary cams 74, 75 and 76 on the auxiliary shaft 77, through the roller arms 80, 81 and 82, links 86, 92 and 97 (Fig. V), and levers 87, 93 and 98 (Fig. VII), effect independent movements of the shaft 88, as well as the sleeves 94 and 99 thereon. These movements are in turn communicated, through the forked fingers 90, 95 and 100 respectively, to the slide rods 60, 69 and the collar 68 (Fig. VIII). As a consequence, the pawls 38, 43 and 64 are retracted from their associated ratchet wheels, as shown in Fig. X, with the pawl 42 alone remaining in active position by virtue of the slot 47a in the link 47. Concurrently with the action just described, the lever 106 is actuated through influence of the rotary cam 110 on the auxiliary shaft 77 with resultant shifting of the roller 54 on the arm 50 into the path of the double lobed cam 105 on the main cam shaft 56. The yoke member 48 is thereby reciprocated with impartation of movement by the pawl 42 to the feed screw 17 until the outer narrowing fingers 29, 32 are positioned in readiness for fashioning the stocking toe. Also at the same time, the cam 111 on the auxiliary cam shaft 77, in acting upon the arm 112, causes the wedge slide 116 (Figs. III and IV) to be thrust forward with resultant spreading of the rollers 121, 122 and shifting of the inner narrowing fingers 30, 31 to meet the outer narrowing fingers 29, 32. When the foregoing has been accomplished, the narrowing fingers 29, 30, 31 and 32 occupy the positions shown in dot-and-dash lines in Fig. I in readiness to proceed with the shaping of the stocking toe upon completion of the instep, when, by another movement of the auxiliary cam shaft 77 and incidental rotative progression of the cams 74, 75 and 76 under control of the measuring chain 125, the pawls 38, 42, 43 and 64 are placed in the position shown in Fig. XI with only the hooked pawl 64 inactive. The feed screw 16 is thereby rotated clockwise through picking of the ratchet wheel 37 thereon as required to progressively reduce the throw of the yarn carriers 139a, 140a and 141a, and the screw 17 at the same time rotated clockwise first to the extent of two teeth of the ratchet 40 by the pawl 42 and back-racked to the extent of one tooth of the ratchet 41 by the hooked pawl 43 for each reciprocation of the yoke member 48, all as customary incident to the knitting of stocking toes. Upon final completion of the stocking foot, another partial rotation of the auxiliary shaft 77 with its cams, under control of the measuring chain 125, results in the placement of the pawls 38, 42, 43 and 64 in the positions of Fig. XII from which it will be seen that only the hooked pawls 43 and 64 are active. In this case however, the effectiveness of the hooked pawl 43 is restricted so that but one tooth of the ratchet wheel 41 is picked at a time. Under this arrangement of the pawls, the two screw shafts 16, 17 are differentially rotated to bring about equalization with regard to their relative positions, whereupon still another movement of the auxiliary cam shaft 77 and its cams results in bringing the pawls 38, 42, 43 and 64 into the positions of Fig. IX. Here it will be seen that the pawls 38, 42 are still inactive while the hooked pawl 43 is fully released from the pin 58 on the collar 59 of its control rod 60 to permit picking of two teeth of the ratchet wheel 41 at a time through a distance corresponding to the picking of the pawl 64 on the ratchet wheel 63, whereby the two feed screws 16, 17 and the parts subject to them are restored to their original starting positions. During back-racking as just explained, the roller arm 50 for actuating the pawls, 43 and 64, through the yoke member 48, is rocked by means of the double lobed cam 105 on the main cam shaft 56 of the machine, the roller 54 having been shifted into the province of said double lobed cam through movement induced in the shifting lever 106 by the rotary cam 110 on the auxiliary shaft 77. The back-racking is thereby effected more rapidly than if the single lobed cam 55 were used for the purpose.

Although I have described the control means of my invention in connection with a stocking "footer", it will be apparent to those skilled in the art that it will operate equally as well with a "legger" in restoring the parts of the fashioning mechanism and the yarn carrier control mechanism of the machine automatically to their original or starting positions after the machine has passed through a cycle of operations necessary to complete knitting of a stocking leg. In a stocking "legger" however, the two narrowing fingers provided for the purposes of fashioning do not require adjustment or setting during the knitting of a stocking leg as was the case with the four narrowing fingers of the "footer".

Attention is especially directed to the fact that the auxiliary control means of my invention constitutes an attachment which is capable of ready application to standard full fashioning stocking knitting machines without necessitating alterations in their construction or normal mode of operation; and which is obviously conducive from the foregoing to the attainment of the desideratum pointed out in the introductory portion of this specification.

Having thus described my invention, I claim:

1. The combination in a flat knitting machine with fashioning mechanism comprising separate feed screws respectively for the yarn carriers and the narrowing fingers, a forward racking pawl for the yarn carrier feed screw, and a forward racking pawl and a back racking pawl for the narrowing point feed screw; of auxiliary means for automatically governing the fashioning mechanism including a supplemental back racking pawl for the yarn carrier feed screw, and instrumentalities determining operation of the two back racking pawls aforesaid to restore the parts of the narrowing mechanism to starting position upon completion of each knitting cycle of the machine.

2. The combination in a flat knitting machine with fashioning mechanism comprising separate feed screws for the yarn carriers and the narrowing fingers, a forward racking pawl for the yarn carrier feed screw, and a forward racking pawl and a back racking pawl for the narrowing finger feed screw; of auxiliary means to automatically govern the fashioning mechanism including a supplemental back racking pawl for the yarn carrier feed screw, means for individually controlling the several forward and back racking pawls incident to knitting and also after completion of each knitting cycle of the machine to restore the parts of the fashioning mechanism to their original positions.

3. The combination in a flat knitting machine with fashioning mechanism comprising separate feed screws for the yarn carriers and the narrowing fingers, a forward racking pawl for the yarn carrier feed screw, and a forward racking pawl and a back racking pawl for the narrowing finger feed screw; of auxiliary means to automatically govern the fashioning mechanism including a supplemental back racking pawl for the yarn carrier feed screw, means for individually controlling the several forward and back racking pawls incident to knitting and also after completion of each knitting cycle of the machine to effect restoration of the parts of the fashioning mechanism to their original positions, the latter means embodying an auxiliary shaft with cams respectively coordinated with the individual controls for said pawls, and means for rotating the auxiliary shaft to bring the cams successively into operative position.

4. The combination in a flat knitting machine with a measuring chain, fashioning mechanism comprising separate feed screws for the yarn carriers and the narrowing fingers, a forward racking pawl for the yarn carrier feed screw, and a forward racking pawl and a back racking pawl for the narrowing finger feed screw; of auxiliary means to automatically govern the fashioning mechanism including a supplemental back racking pawl for the yarn carrier feed screw, means for individually controlling the several forward and back racking pawls aforesaid incident to knitting and also after completion of the knitting cycle of the machine to automatically effect restoration of the parts of the fashioning mechanism to their original positions, the latter means embodying an auxiliary shaft with cams thereon respectively coordinated with the individual controls for said pawls, and mechanism subject to the measuring chain of the machine for rotating the auxiliary cam shaft.

5. The combination in a flat knitting machine with fashioning mechanism comprising separate feed screws for the yarn carriers and the narrowing fingers, a forward racking pawl for the yarn carrier feed screw, a forward racking pawl and a back racking pawl for the narrowing finger feed screw, and detents to cooperate with notched index disks on said screws; of auxiliary means to automatically govern the fashioning mechanism including a supplemental back racking pawl for the yarn carrier feed screw, and instrumentalities for retracting the forward racking pawls aforesaid and concurrently withdrawing the detents from engagement with the index disks to permit reverse rotation of the feed screws by the back racking pawls at the completion of the knitting cycle of the machine, thereby to restore the parts of the fashioning mechanism to their original positions.

6. The combination in a flat stocking knitting machine with fashioning mechanism comprising separate feed screws respectively for the yarn carriers and the narrowing fingers, a back racking pawl for the narrowing point feed screw, and a main cam shaft shiftable longitudinally for placement of a single lobed cam thereon into the plane of a roller on an actuating arm coordinated with the pawls aforesaid to effect normal operation of the fashioning mechanism; of auxiliary means for automatically governing the fashioning mechanism including a supplemental back racking pawl for the yarn carrier feed screw, instrumentalities determining release of the two back racking pawls at the completion of the knitting cycle in readiness to restore the parts of the fashioning mechanism to their original positions, a double lobed cam on the main cam shaft, and means for shifting the roller on the actuating arm aforesaid into the path of the double lobed cam to operate the back racking pawls for the purpose indicated.

7. The combination in a flat stocking knitting machine with fashioning mechanism comprising separate feed screws respectively for the yarn carriers and the narrowing fingers, a back racking pawl for the narrowing point feed screw, and a main cam shaft shiftable longitudinally for placement of a single lobed cam thereon into the plane of a roller on an actuating arm coordinated with the pawls in determining normal racking of the two feed screws incident to knitting; of auxiliary means for automatically governing the fashioning mechanism including a supplemental back racking pawl for the yarn carrier feed screw, instrumentalities determining release of the two back racking pawls at the completion of the knitting cycle in readiness to restore the parts of the fashioning mechanism to their original positions, a double lobed cam on the main cam shaft, an auxiliary shaft, a lever influenced by a cam on said auxiliary shaft to shift the roller on the actuating arm aforesaid into the path of the double lobed cam on the main cam shaft and thereby effect operation of the back racking pawls to restore the fashioning mechanism as aforesaid.

8. The combination in a flat stocking knitting machine with fashioning mechanism comprising a measuring chain; separate feed screws respectively for the yarn carriers and the narrowing fingers, a back racking pawl for the narrowing finger feed screw, and a main cam shaft shiftable longitudinally for placement of a single lobed cam thereon into the plane of a roller on an actuating arm coordinated with the pawls aforesaid; of auxiliary means for automatically governing the fashioning mechanism including a supplemental back racking pawl for the yarn carrier feed screw, instrumentalities determining release of the two back racking pawls aforesaid at the completion of the knitting cycle in readiness to restore the parts of the fashioning mechanism to their original positions, a double lobed cam on the main cam shaft, a lever influenced by a rotary cam on an auxiliary shaft instrumental in shifting the roller on the actuating arm aforesaid into the path of the double lobed cam on the main cam shaft to effect operation of the back racking pawls and restoration of the fashioning mechanism, and ratchet mechanism subject to the measuring chain of the machine to intermittently actuate the auxiliary cam shaft.

9. The combination in a flat stocking footer with fashioning mechanism comprising separate feed screws respectively for the yarn carriers and for the outer and inner narrowing fingers whereby shaping of the insteps and toes of the stocking feet is accomplished, a forward racking pawl for the yarn carrier feed screw, and a forward and a back racking pawl for the feed screw coordinated with the narrowing fingers; of auxiliary means for automatically governing the fashioning mechanism including a supplemental back racking pawl for the yarn carrier feed screw, and instrumentalities governing the several forward and back racking pawls aforesaid operative after shaping of the instep, to position the outer and inner narrowing points in preparation for shaping the stocking toes, and, at the completion of the knitting cycle of the machine, to restore the parts of the fashioning mechanism to their original positions.

10. The combination in a flat stocking footer with fashioning mechanism comprising separate feed screws respectively for the yarn carriers and for the outer and inner narrowing fingers whereby shaping of the insteps and toes of the stocking feet is accomplished, a forward racking pawl for the yarn carrier feed screw, and a forward racking pawl and back racking pawl for the narrowing finger feed screw; of auxiliary means to automatically govern the fashioning mechanism including a supplemental back racking pawl for the yarn carrier feed screw, and instrumentalities governing the several forward and back racking pawls aforesaid operative, after shaping of the insteps of the stocking feet, to position the outer and inner narrowing points in preparation for shaping the stocking toes, and upon completion of the knitting cycle of the machine to first equalize the positions of the two feed screws by differential back racking and thereafter to uniformly back rack them in restoring the parts of the fashioning mechanism to their original positions.

11. The combination in a flat stocking footer with fashioning mechanism comprising a feed screw for rods carrying outer and inner narrowing fingers whereby shaping of the insteps and toes of the stocking feet is accomplished; of auxiliary means to automatically govern the fashioning mechanism including instrumentalities operative after fashioning of the insteps of the stocking feet, to position the outer narrowing fingers in readiness for shaping the stocking toes, and a wedge member concurrently operative through thrusting thereof between projections on the rods of the inner narrowing fingers to separate the latter and position them adjacent the outer narrowing fingers.

12. The combination in a flat stocking footer with fashioning mechanism comprising a feed screw for rods carrying outer and inner narrowing fingers whereby shaping of the instep and toes of the stocking feet is accomplished; of auxiliary means to control the fashioning mechanism including instrumentalities operative, after shaping of the insteps of the stocking feet to position the outer narrowing fingers in readiness to shape the stocking toe, a wedge member adapted to be concurrently thrust between projections on the rods of the inner narrowing fingers to position them adjacent the outer narrowing fingers, and an auxiliary shaft with a cam thereon for actuating the wedge member.

13. The combination in a flat stocking footer with a measuring chain, fashioning mechanism comprising a feed screw for rods carrying outer and inner narrowing fingers whereby shaping of the insteps and toes of the stocking feet is accomplished; of auxiliary means to automatically govern the fashioning mechanism including instrumentalities operative, after shaping of the insteps of the stocking feet, to position the outer fingers in readiness for shaping the stocking toes, a wedge member adapted to be concurrently thrust between projections on the rods of the inner narrowing fingers to separate the latter and position them adjacent the outer narrowing fingers, and means subject to the measuring chain of the machine for actuating the wedge member as aforesaid.

14. The combination in a flat stocking footer with fashioning mechanism comprising a feed screw for rods carrying outer and inner narrowing fingers whereby shaping of the insteps and toes of the stocking feet is accomplished; of auxiliary means to automatically govern the fashioning mechanism including instrumentalities operative after fashioning of the insteps of the stocking feet, to position the outer narrowing fingers in readiness for shaping the stocking toes, and means concurrently operative to separate the inner narrowing fingers and position them adjacent the outer narrowing fingers.

15. In a knitting machine, a set of reciprocable yarn-carrier rods, stops for said rods to limit their reciprocation, a threaded carrier nut for said stops, a screw shaft supporting said nut, a ratchet and pawl arrangement for rotating said shaft to advance said nut intermittently and thereby reduce the travel of said rods in a planned manner, a detent for locking said ratchet between rotations thereof, and means automatically operative after a predetermined advance of said nut to withdraw said detent, disengage said pawl and ratchet, and rotate said shaft in the reverse direction.

16. In a knitting machine, a set of reciprocable yarn-carrier rods, stops for said rods to limit their reciprocation, a threaded carrier nut for said stops, a screw shaft supporting said nut, a ratchet and pawl arrangement for rotating said shaft to advance said nut intermittently and thereby reduce the travel of said rods in a planned manner, a detent for locking said ratchet between rotations thereof, and means automatically operative after a predetermined advance of said nut to withdraw said detent, disengage said pawl and ratchet, and rotate said shaft in the reverse direction; said last-named means comprising a rock-shaft, and arms carried thereby and engaging said detent and said pawl to move the latter when the rock-shaft is rocked.

17. In a knitting machine, a set of reciprocable yarn-carrier rods, stops for said rods to limit their reciprocation, a threaded carrier nut for said stops, a screw shaft supporting said nut, means for rotating said shaft to advance said nut axially with respect to said rods so as to reduce the travel of said rods in a predetermined manner, a normally inoperative reversing mechanism for said shaft, a detent for locking said shaft intermittently during its normal rotation, and means automatically operative after a predetermined advance of said nut to withdraw said detent and to render said reversing mechanism operative.

18. In a knitting machine, a set of reciprocable yarn-carrier rods, stops for said rods to limit their reciprocation, a threaded carrier nut for said stops, a screw shaft supporting said nut, a ratchet and pawl arrangement for rotating said shaft to advance said nut intermittently and thereby reduce the travel of said rods in a planned manner, a detent for locking said ratchet between rotations thereof, a normally inoperative reversing mechanism for said shaft, and means automatically operative after a predetermined advance of said nut to withdraw said detent, disengage said pawl and ratchet, and render said reversing mechanism operative.

19. The combination in a flat stocking knitting machine with fashioning mechanism comprising a feed screw for the yarn carrier rods, and a feed screw for the narrowing point rods, as well as means for forward racking the yarn carrier rod screw and for forward and reverse racking the narrowing point rod feed screw in determining the profile shape of the stocking web produced on the machine; of automatically-actuated mechanism, including auxiliary back racking means, to differentially rotate the feed screws aforesaid reversely, thereby to restore the fashioning mechanism to normal or starting position at the completion of each knitting cycle.

WILBUR I. TEBO.